(12) United States Patent
Fujii (10) Patent No.: US 12,280,758 B2
(45) Date of Patent: Apr. 22, 2025

(54) VEHICLE CONTROL DEVICE

(71) Applicant: TOYOTA JIDOSHA KABUSHIKI KAISHA, Toyota (JP)

(72) Inventor: Tatsushi Fujii, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 292 days.

(21) Appl. No.: 17/985,537

(22) Filed: Nov. 11, 2022

(65) Prior Publication Data

US 2023/0150464 A1    May 18, 2023

(30) Foreign Application Priority Data

Nov. 16, 2021    (JP) .................................. 2021-186550

(51) Int. Cl.
 *B60T 8/32*    (2006.01)
(52) U.S. Cl.
 CPC ......... *B60T 8/3205* (2013.01); *B60T 2201/10* (2013.01); *B60T 2250/00* (2013.01)
(58) Field of Classification Search
 None
 See application file for complete search history.

(56) References Cited

U.S. PATENT DOCUMENTS

| | | | |
|---|---|---|---|
| 2009/0118958 A1 | 5/2009 | Abe | |
| 2019/0023267 A1* | 1/2019 | Takagi | ................... G01S 15/86 |
| 2019/0135247 A1* | 5/2019 | Luo | ......................... B60T 8/172 |
| 2020/0031336 A1 | 1/2020 | Akatsuka | |
| 2021/0107481 A1 | 4/2021 | Fukuda et al. | |
| 2021/0213952 A1* | 7/2021 | Willison | ............. B60W 50/087 |

FOREIGN PATENT DOCUMENTS

| | | |
|---|---|---|
| JP | 2006-160077 A | 6/2006 |
| JP | 2007-255382 A | 10/2007 |
| JP | 2008-30539 A | 2/2008 |
| JP | 2020-015402 A | 1/2020 |
| JP | 2020-104529 A | 7/2020 |
| JP | 2021-62704 A | 4/2021 |

* cited by examiner

*Primary Examiner* — Christian Chace
*Assistant Examiner* — Shayne M. Gilbertson
(74) *Attorney, Agent, or Firm* — Sughrue Mion, PLLC (57) ABSTRACT

The vehicle control device: controls the drive device and the braking device such that an actual acceleration representing an actual acceleration of the vehicle coincides with a target acceleration for driving the vehicle so that the vehicle stops at a preset target stop position; acquires the target acceleration every time a predetermined time elapses, and sets the target acceleration to a value such that the magnitude of the change amount does not exceed the threshold change amount when the magnitude of the change amount representing the difference between the target acceleration and the previous target acceleration exceeds the threshold change amount; and sets the threshold change amount to a larger value than when the emergency condition is not satisfied in a case where a predetermined emergency condition is satisfied in a case where a driving force or a braking force larger than in a normal state is required.

3 Claims, 5 Drawing Sheets

VEHICLE CONTROL DEVICE

CROSS-REFERENCE TO RELATED APPLICATION

This application claims priority to Japanese Patent Application No. 2021-186550 filed on Nov. 16, 2021, incorporated herein by reference in its entirety.

BACKGROUND

1. Technical Field

The present disclosure relates to a vehicle control device that causes a vehicle to travel so as to stop the vehicle at a predetermined target stop position.

2. Description of Related Art

A vehicle control device that causes a vehicle to travel to a target stop position so as to stop the vehicle at the target stop position has been known. Such a vehicle control device controls a drive device and a braking device of the vehicle such that the actual acceleration that is the acceleration of the vehicle coincides with the "target acceleration for causing the vehicle to travel so that the vehicle stops at the target stop position". The drive device is a device that applies a driving force to the vehicle, and the braking device is a device that applies a braking force to the vehicle.

For example, the vehicle control device described in Japanese Unexamined Patent Application Publication No. 2020-15402 (JP 2020-15402 A) (hereinafter, referred to as a "conventional device") increases the target acceleration when the vehicle stops due to disturbance, which disturbs travel of the vehicle, while the vehicle is traveling to the target stop position. Accordingly, even if the vehicle stops due to the disturbance, the conventional device can increase the possibility of causing the vehicle to travel to the target stop position by causing the vehicle to travel against the disturbance.

SUMMARY

When there is a control hysteresis in at least one of the drive device and the braking device, the time required for the actual acceleration to coincide with the target acceleration becomes longer. This may cause the target acceleration to rapidly increase or decrease. When such a rapid increase or decrease in the target acceleration is repeated, the vehicle may repeat rapid acceleration and rapid deceleration, which may cause the vehicle to vibrate in the vertical direction.

In order to reduce the possibility that such a rapid increase or decrease in the target acceleration occurs, the present inventor has studied a vehicle control device having the following configuration. The above configuration is a configuration in which the current target acceleration is set so that the magnitude of the change amount representing the difference between the target acceleration acquired this time (the current target acceleration) and the target acceleration acquired last time (the previous target acceleration) does not exceed the threshold change amount. This configuration may be referred to as a "change amount limiter".

A vehicle control device including such a change amount limiter may control the drive device and the braking device based on a target acceleration having a magnitude smaller than the magnitude of the required target acceleration. In this case, the required drive force or braking force may not be applied to the vehicle. If the driving force required for the vehicle to travel against the disturbance is not applied to the vehicle when the disturbance occurs, the vehicle stops. If the braking force required to stop the vehicle at the target stop position is not applied to the vehicle, the vehicle cannot stop at the target stop position.

The present disclosure has been made to address the above-mentioned issues. That is, an object of the present disclosure is to provide a vehicle control device capable of reducing the vibration of the vehicle in a normal state and controlling the drive device and the braking device at the required target acceleration when a larger driving force or braking force than in a normal state is required, even when there is a control hysteresis in at least one of the drive device and the braking device.

A vehicle control device of the present disclosure (hereinafter, also referred to as a "device of the present disclosure") includes: a drive device (34a) for applying a driving force to a vehicle; a braking device (44a) for applying a braking force to the vehicle; and a control unit (20, 30, 40) for controlling the drive device and the braking device such that an actual acceleration representing an actual acceleration of the vehicle coincides with a target acceleration for causing the vehicle to travel such that the vehicle stops at a preset target stop position. The control unit is configured to: acquire the target acceleration every time a predetermined time elapses (step 325); set, when a magnitude of a change amount representing a difference between a current target acceleration that is the target acceleration acquired this time and a previous target acceleration that is the target acceleration acquired last time exceeds a threshold change amount ("No" in step 335), the current target acceleration to a value such that the magnitude of the change amount does not exceed the threshold change amount (step 355); and set, when a predetermined emergency condition is satisfied ("Yes" in step 515, "Yes" in step 535, "Yes" in step 545), the emergency condition being a condition that is satisfied when the driving force or the braking force larger than the driving force or the braking force in a normal state is required, the threshold change amount to a larger value (step 520, step 550) than when the emergency condition is not satisfied ("No" in step 545, step 555).

The device of the present disclosure sets the current target acceleration to "a value such that the magnitude of the change amount does not exceed the threshold change amount". Accordingly, even when there is a control hysteresis in at least one of the drive device and the braking device, it is possible to suppress the vehicle from accelerating and decelerating rapidly. As a result, the possibility that the vehicle VA vibrates can be reduced.

Furthermore, when the emergency condition is satisfied, the device of the present disclosure may set the threshold change amount to a larger value than when the emergency condition is not satisfied. Accordingly, when a larger driving force or a larger braking force than in the normal state is required, a larger change in the target acceleration is allowed than in the normal state. As a result, when a driving force larger than that in the normal state is required, it is possible to increase the possibility that the driving force necessary for the drive device can be applied to the vehicle, and when a braking force larger than that in the normal state is required, it is possible to increase the possibility that the braking force necessary for the drive device and the braking device can be applied to the vehicle.

In one aspect of the device of the present disclosure, the control unit may determine whether the emergency condition is satisfied based on a disturbance value representing a magnitude of a disturbance that disturbs travel of the vehicle and a remaining distance representing a remaining distance to the target stop position (step 515, step 525, step 540, step 545).

If the disturbance value is large, there is a high possibility that a larger driving force is required to cause the vehicle to travel against the disturbance. If the remaining distance is short, there is a high possibility that a larger braking force is required to stop the vehicle at the target stop position. Since it is determined whether the emergency condition is satisfied based on the disturbance value and the remaining distance, it is possible to enhance the certainty that the emergency condition is determined to be satisfied when the driving force or the braking force larger than that in the normal state is required (certainty of the determination of the emergency condition).

In the above aspect, the control unit may be configured to determine that the emergency condition is satisfied when any one of a first condition, a second condition, a third condition, and a fourth condition is satisfied. The first condition is a condition that the disturbance value is equal to or larger than a threshold value (step 515), the second condition is a condition that the actual acceleration is equal to or larger than a threshold acceleration set based on the remaining distance (step 535), the third condition is a condition that the vehicle has passed the target stop position (step 540), and the fourth condition is a condition that the remaining distance has become equal to or smaller than a predetermined threshold distance (step 545).

The first condition is satisfied when there is a high possibility that a large driving force is required. The second condition and the fourth condition are satisfied when there is a high possibility that a large braking force is required for the vehicle to stop at the target stop position. The third condition is satisfied when the vehicle has passed through the target stop position. Therefore, the third condition is satisfied when a large braking force is likely to be required because the vehicle needs to be stopped immediately. When any one of the first to fourth conditions is satisfied, it is determined that the emergency condition is satisfied, and thus the certainty of the determination of the emergency condition can be enhanced.

In the above aspect, the control unit may be configured to set the threshold change amount to a larger value when any one of the first condition to the third condition is satisfied (step 520) than when the fourth condition is satisfied (step 550).

When any one of the first to third conditions is satisfied, the degree of urgency in which the "large driving force or braking force" is required is higher than that in the case where the fourth condition is satisfied, and therefore it is necessary to apply the required driving force or braking force to the vehicle as soon as possible. Therefore, when any one of the first to third conditions is satisfied, the threshold change amount is set to a larger value than when the fourth condition is satisfied. Accordingly, it is possible to further reduce the possibility that the vehicle vibrates, and to further increase the possibility that a driving force and a braking force necessary for the drive device and the braking device can be applied to the vehicle.

In the above description, in order to help understanding of the disclosure, the names and/or the reference symbols used in the embodiment are added in parentheses to the configurations of the disclosure corresponding to the embodiment to be described later. However, respective components of the disclosure are not limited to the embodiment defined by the above names and/or reference symbols. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Structure

Figure 1:
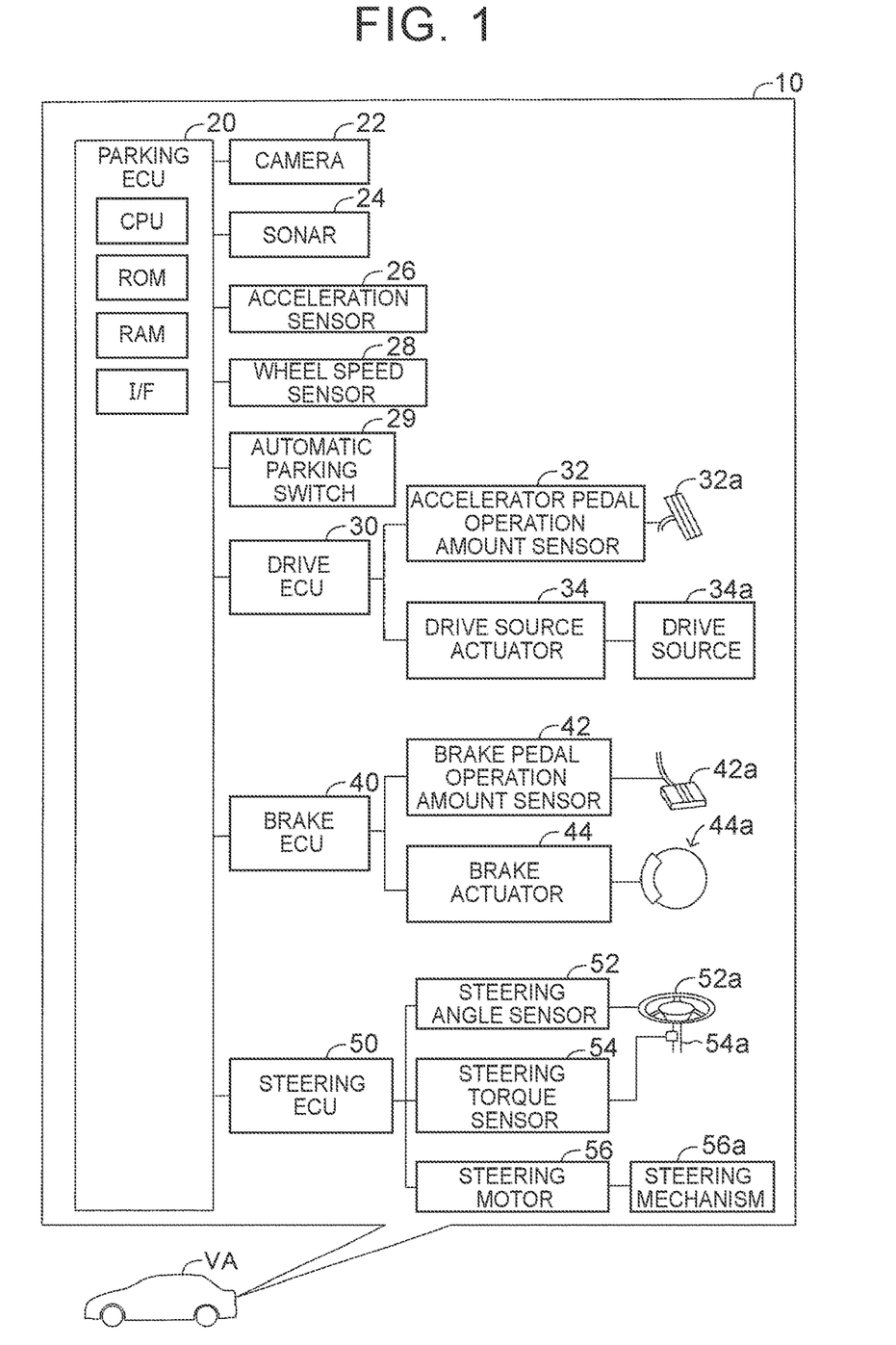
FIG. 1 is a schematic configuration diagram of a vehicle control device according to an embodiment of the present disclosure.

As shown in FIG. 1, a vehicle control device 10 according to the present embodiment (hereinafter referred to as the "control device 10") is mounted (applied) on (to) a vehicle VA. The control device 10 includes a parking ECU 20, a drive ECU 30, a brake ECU 40, and a steering ECU 50. ECU 20, 30, 40, and 50 are connected to each other via Controller Area Network (CAN) (not shown) so as to be able to transmit and receive data.

The ECU is an abbreviation for an electronic control unit, and is an electronic control circuit having a microcomputer including a central processing unit (CPU), a read-only memory (ROM), a random access memory (RAM), a non-volatile memory, an interface, and the like as a main component. The ECU may be referred to as a "control unit" or a "controller". The CPU realizes various functions by executing instructions (routines) stored in the memory (ROM). All or some of ECU 20, 30, 40 and 50 may be integrated into one ECU.

The control device 10 includes a plurality of cameras 22, a plurality of sonars 24, an acceleration sensor 26, a plurality of wheel speed sensors 28, and an automatic parking switch 29. These units 22 to 29 are connected to the parking ECU 20 so as to transmit and receive data to and from the parking ECU 20.

The cameras 22 include a front camera, a rear camera, a left camera, and a right camera. Each of the cameras 22 generates image data by capturing an image of an area described below every time a predetermined time elapses, and transmits the image data to the parking ECU 20. The front camera, the rear camera, the left camera, and the right camera capture an image of an area in front of the vehicle VA, an image of an area behind the vehicle VA, an image of an area on the left side of the vehicle VA, and an image of an area on the right side of the vehicle VA, respectively.

The sonars 24 include a front sonar, a rear sonar, a left sonar, and a right sonar. Each of the sonars 24 transmits a sound wave to an area described below, and receives a reflected wave of the sound wave from an object. Each of the sonars 24 transmits information regarding the transmitted sound wave and the received reflected wave (that is, sonar data) to the parking ECU 20 every time a predetermined time elapses. The front sonar, the rear sonar, the left sonar, and the right sonar transmit sound waves to the area in front of the vehicle VA, the area behind the vehicle VA, the area on the left side of the vehicle VA, and the area on the right side of the vehicle VA, respectively.

The parking ECU 20 recognizes an object existing around the vehicle VA based on the image data and the sonar data, and recognizes a white line on a road surface around the vehicle VA based on the image data.

The acceleration sensor 26 measures the actual acceleration G in the front-rear direction of the vehicle VA and generates a detection signal representing the acceleration G. The parking ECU 20 specifies the acceleration G of the vehicle VA based on the detected signal received from the acceleration sensor 26. The acceleration G may be referred to as "actual acceleration".

The wheel speed sensor 28 is provided for each wheel of the vehicle VA. Each wheel speed sensor 28 generates one wheel pulse signal each time a corresponding wheel rotates by a predetermined angle. The parking ECU 20 counts the number of pulses in units of time of the wheel pulse signal received from each wheel speed sensor 28, and acquires the rotational speed of each wheel based on the number of pulses. Then, the parking ECU 20 acquires the vehicle speed Vs indicating the speed of the vehicle VA based on the wheel speeds of the respective wheels. In one embodiment, the parking ECU 20 obtains the mean of the wheel speeds of the four wheels as the vehicle speed Vs.

The automatic parking switch 29 is disposed near the steering wheel 52a of the vehicle. The driver operates the automatic parking switch 29 when it is desired to execute the automatic parking control. The automatic parking control is a control for automatically causing the vehicle VA to travel to the target stop position so that the vehicle VA stops at the target stop position.

The drive ECU 30 is connected to the accelerator pedal operation amount sensor 32 and the drive source actuator 34 so as to transmit and receive data to and from the accelerator pedal operation amount sensor 32 and the drive source actuator 34.

The accelerator pedal operation amount sensor 32 detects an accelerator pedal operation amount AP that is an operation amount of an accelerator pedal 32a by the driver, and generates a signal representing the accelerator pedal operation amount AP. The drive ECU 30 specifies the accelerator pedal operation amount AP on the basis of a signal generated by the accelerator pedal operation amount sensor 32.

The drive source actuator 34 is connected to a drive source (motor, internal combustion engine, etc.) 34a that generates the driving force applied to the vehicle VA. The drive source 34a may be referred to as a "drive device". The drive ECU 30 changes the operating condition of the drive source 34a by controlling the drive source actuator 34. Accordingly, the drive ECU 30 can adjust the driving force applied to the vehicles VA. The drive ECU 30 controls the drive source actuator 34 so that the driving force applied to the vehicles VA increases as the accelerator pedal operation amount AP or the required amount from the parking ECU 20 increases.

The brake ECU 40 is connected to the brake pedal operation amount sensor 42 and the brake actuator 44 so as to transmit and receive data to and from the brake pedal operation amount sensor 42 and the brake actuator 44.

The brake pedal operation amount sensor 42 detects a brake pedal operation amount BP that is an operation amount of the brake pedal 42a, and generates a signal representing the brake pedal operation amount BP. The brake ECU 40 specifies the brake pedal operation amount BP based on the signal generated by the brake pedal operation amount sensor 42.

The brake actuator 44 is connected to a well-known hydraulic braking device 44a. The brake ECU 40 changes friction braking force generated by the braking device 44a by controlling the brake actuator 44. Accordingly, the brake ECU 40 can adjust the braking force applied to the vehicles VA. The brake ECU 40 controls the brake actuator 44 such that the braking force applied to the vehicles VA increases as the required amount from the brake pedal operation amount BP or the parking ECU 20 increases.

The steering ECU 50 is connected to the steering angle sensor 52, the steering torque sensor 54, and the steering motor 56.

The steering angle sensor 52 detects a rotation angle of a steering wheel 52a from the neutral position thereof as a steering angle θs, and generates a signal representing the steering angle θs. The steering ECU 50 specifies the steering angle θs based on a signal generated by the steering angle sensor 52.

The steering torque sensor 54 detects steering torque Tr representing torque acting on a steering shaft 54a connected to the steering wheel 52a, and generates a signal representing the steering torque Tr. The steering ECU 50 specifies the steering torque Tr based on a signal generated by the steering torque sensor 54.

The steering motor 56 generates torque according to electric power supplied from a vehicle battery (not shown). The steering ECU 50 controls the direction and magnitude of the electric power supplied to the steering motor 56. The steering motor 56 is incorporated such that the torque can be transmitted to a steering mechanism 56a of the vehicle VA. The steering mechanism 56a includes the steering wheel 52a, the steering shaft 54a, a steering gear mechanism, and the like. The torque generated by the steering motor 56 is generated by steering assist torque to steer (turn) right and left steered wheels.

The steering ECU 50 normally generates the steering assist torque corresponding to the steering torque Tr by using the steering motor 56. Further, when the steering ECU 50 receives the "steering command including the target steering angle" from the parking ECU 20, it controls the steering motor 56 so that the steering angle θs matches the "target steering angle included in the received steering command", thereby automatically turning the steered wheels.

Outline of Operation

The control device 10 executes automatic parking control. While the automatic parking control is being executed, the control device 10 acquires target acceleration Gtgt for the vehicle VA to travel along the "travel route to the target stop position" and the vehicle VA to stop at the target stop position every time a predetermined period of time elapses. The control device 10 acquires the variation ΔGtgt by subtracting the previous target acceleration Gtgt' from the current target acceleration Gtgt. The target acceleration Gtgt is the target acceleration Gtgt acquired at the present time (acquired at the present time). The previous target acceleration Gtgt' is a target acceleration Gtgt acquired (previously acquired) in advance of a predetermined period of time from the current time.

The control device 10 sets the target acceleration Gtgt so that the magnitude (|ΔGtgt|) of the change amount ΔGtgt does not exceed the threshold change amount ΔGth, and transmits an acceleration/deceleration command including the target acceleration Gtgt to the drive ECU 30 and the brake ECU 40.

The drive ECU 30 and the brake ECU 40 control the drive source 34a and the braking device 44a via the drive source actuator 34 and the brake actuator 44 so that the acceleration G coincides with the target acceleration Gtgt included in the acceleration/deceleration command, respectively. When the target acceleration Gtgt is greater than 0, the drive ECU 30 and the brake ECU 40 control the drive source 34a and the braking device 44a so as to accelerate the vehicle VA (i.e., to apply a driving force to the vehicle VA), respectively. When the target acceleration Gtgt is smaller than 0, the drive ECU 30 and the brake ECU 40 control the drive source 34a and the braking device 44a so as to decelerate the vehicle VA (that is, apply a braking force to the vehicle VA), respectively.

The control device 10 determines whether or not a predetermined emergency condition (which will be described later with reference to FIG. 2) that is satisfied when a driving force or a braking force that is larger than a normal state is required is satisfied. When the emergency-condition is not satisfied, the control device 10 sets the threshold variation ΔGth to the normal threshold Gnth. On the other hand, when the emergency condition is satisfied, the control device 10 sets the threshold change amount ΔGth to the emergency threshold value Gkth. The urgent threshold Gkth is set to be larger than the normal threshold Gnth.

When the emergency condition is satisfied, the control device 10 increases the threshold change amount ΔGth as compared with a case where the emergency condition is not satisfied. Accordingly, the control device 10 can reduce the possibility that the vehicles VA vibrate due to the repetition of the rapid increase and decrease of the target acceleration Gtgt in a normal state. In addition, the control device 10 can control the drive source 34a and the braking device 44a at a required target acceleration when a driving force or a braking force larger than that in a normal state is required. Therefore, it is possible to increase the possibility that the vehicle VA can travel to the target stop position even if disturbance that hinders the progress of the vehicle VA occurs, and to increase the possibility that the vehicle VA can be accurately stopped at the target stop position.

Emergency Conditions

Emergency conditions will be described with reference to FIG. 2. When any one of the following first to fourth conditions is satisfied, the control device 10 determines that the emergency condition is satisfied.

First Condition

The control device 10 determines that the first condition is satisfied when the disturbance value Dv representing the magnitude of the disturbance that prevents the vehicle VA from traveling is equal to or larger than the threshold Dvth. The control device 10 obtains the disturbance value Dv by subtracting the acceleration G from the target acceleration Gtgt. The larger the disturbance value Dv, the larger the disturbance.

Figure 2:
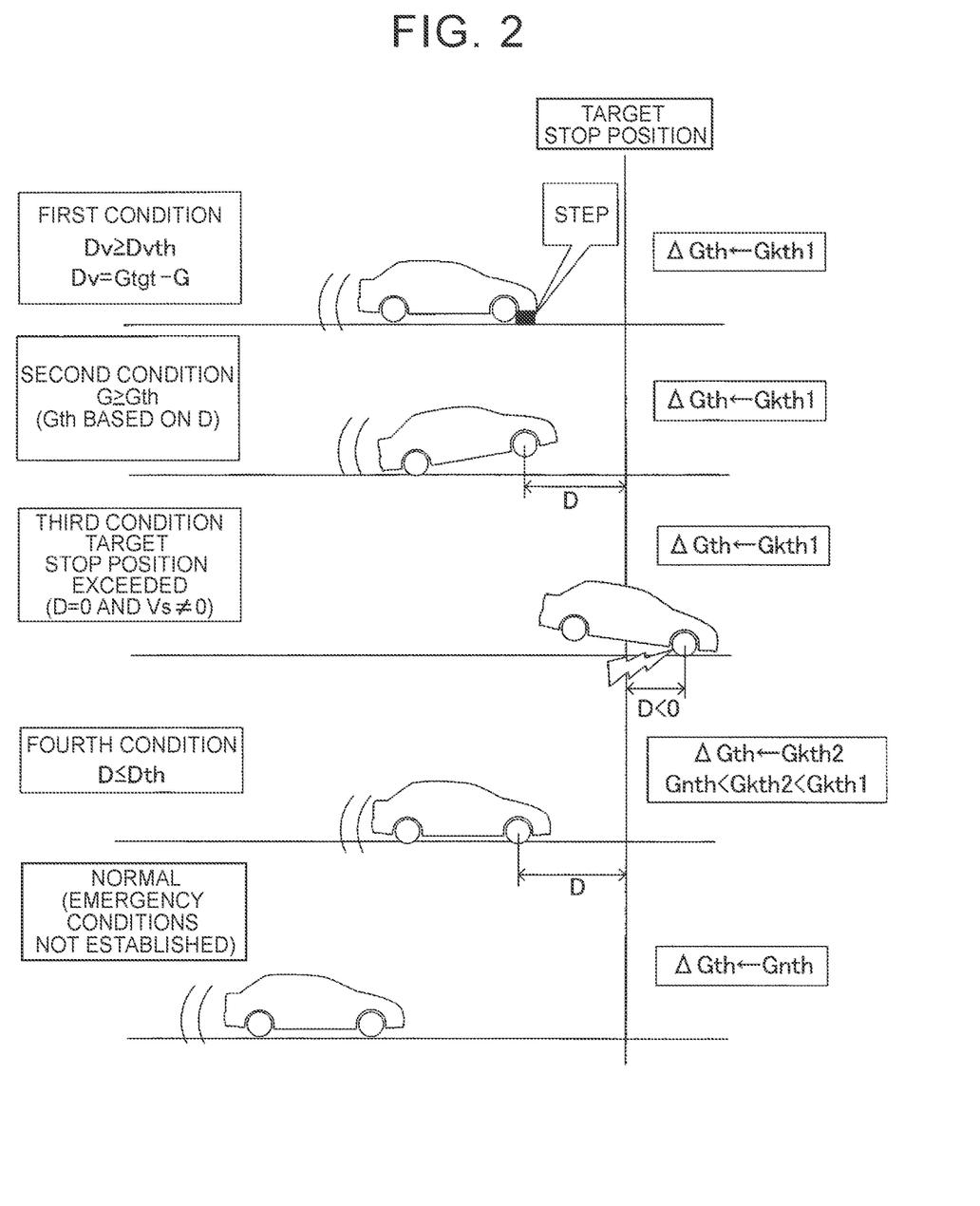
FIG. 2 is an explanatory diagram of an emergency condition.

For example, when the front wheel of the vehicle VA is in contact with the step as shown in FIG. 2, the travel of the vehicle VA is hindered by the step, and the vehicle VA cannot be accelerated. Therefore, the disturbance value Dv becomes larger than that in the normal state, and there is a high possibility that the first condition is satisfied. The first condition is a condition that is satisfied when a driving force larger than that in the normal state is required.

<Second Condition>

The control device 10 determines that the second condition is satisfied when the acceleration G is equal to or greater than the threshold acceleration Gth set based on the remaining distance D representing the remaining distance to the target stop position. As an example, the threshold acceleration Gth is set to become smaller from a value larger than 0 as the remaining distance D becomes shorter. More specifically, the threshold acceleration Gth is set in advance to a value at which the acceleration G becomes "0" when the remaining distance D becomes "0" (that is, when the vehicle VA reaches the target stopping position), assuming that a change in the target acceleration Gtgt is allowed within the range of the normal threshold Gnth. Therefore, if the acceleration G is equal to or greater than the threshold acceleration Gth, there is a possibility that the vehicle VA cannot stop without the acceleration G being "0" when the vehicle VA reaches the target stop position. Therefore, the second condition is a condition that is satisfied when a larger braking force than in the normal state is required.

The remaining distance D is acquired as follows. Based on the image data and the sonar data, the control device 10 acquires, as the remaining distance D, the distance traveled by the vehicle VA when the vehicle VA moves along the travel route from the current position to the target stop position of the vehicle VA every time the predetermined time elapses. Note that, for example, there is a case where a three-dimensional object existing between the camera 22 and the target stop position causes the image data to not include the target stop position. In this case, the remaining distance D cannot be obtained by surviving the image data and the sonar data. In such a case, the control device 10 specifies the measured distance Dm, which is the distance actually moved by the vehicle VA from the point of acquisition of the previous remaining distance D, based on the wheel pulse signal from the wheel speed sensor 28, and acquires the remaining distance D by subtracting the measured distance Dm from the previous remaining distance D.

Third Condition

The control device 10 determines that the third condition is satisfied when it is determined that the vehicle VA is not stopped even when the vehicle VA reaches the target stop position based on the remaining distance D. More specifically, the control device 10 determines that the third condition is satisfied when the vehicle speed Vs is not "0" when the remaining distance D is "0". When the third condition is satisfied, the vehicle VA needs to stop immediately. Therefore, the third condition is a condition that is satisfied when a larger braking force than in the normal state is required.

4th Condition

When the remaining distance D is equal to or smaller than the threshold distance Dth, the control device 10 determines that the fourth condition is satisfied. When the remaining distance D is equal to or less than the threshold distance Dth, the vehicle VA is relatively close to the target stop position, and it is necessary to allow a sudden deceleration for the vehicle VA to stop at the target stop position. Therefore, the fourth condition is a condition that is satisfied when a larger braking force than in the normal state is required.

Here, the first emergency threshold Gkth1 and the second emergency threshold Gkth2 are prepared as emergency threshold Gkth. The first emergency threshold Gkth1 is set to be larger than the second emergency threshold Gkth2. The normal threshold Gnth is the smallest and the first emergency threshold Gkth1 is the largest among the normal threshold Gnth, the first emergency threshold Gkth1, and the second emergency threshold Gkth2.

When any one of the first condition and the third condition is satisfied, the control device 10 sets the threshold variation ΔGth to the first urgent threshold Gkth1. When the fourth condition is satisfied, the control device 10 sets the threshold variation ΔGth to the second urgent threshold Gkth2.

When any one of the first to third conditions is satisfied, the degree of urgency in which the "large driving force or braking force" is required is higher than that in the case where the fourth condition is satisfied, and therefore, it is necessary to apply the required driving force or braking force to the vehicle earlier. Therefore, when any one of the first condition to the third condition is satisfied, the threshold variation ΔGth is set to "the first emergency threshold Gkth1 larger than the second emergency threshold Gkth2" as compared with the case where the fourth condition is satisfied.

When none of the first condition and the fourth condition is satisfied, that is, when the urgent condition is not satisfied, the control device 10 sets the threshold variation ΔGth to the normal threshold Gnth.

As described above, the control device 10 determines whether any one of the first condition to the fourth condition (that is, the emergency condition) is satisfied based on the disturbance value Dv and the remaining distance D, and when the emergency condition is satisfied, sets the threshold change amount ΔGth having a larger value than that in the case where the emergency condition is not satisfied.

Specific Operation

<Automatic Parking Routine>

The CPU of the parking ECU 20 (hereinafter, referred to as "CPU" unless otherwise specified, refers to the CPU of the parking ECU 20) executes the automated parking routine illustrated by the flow chart in FIG. 3 every time a predetermined period of time elapses.

Figure 3:
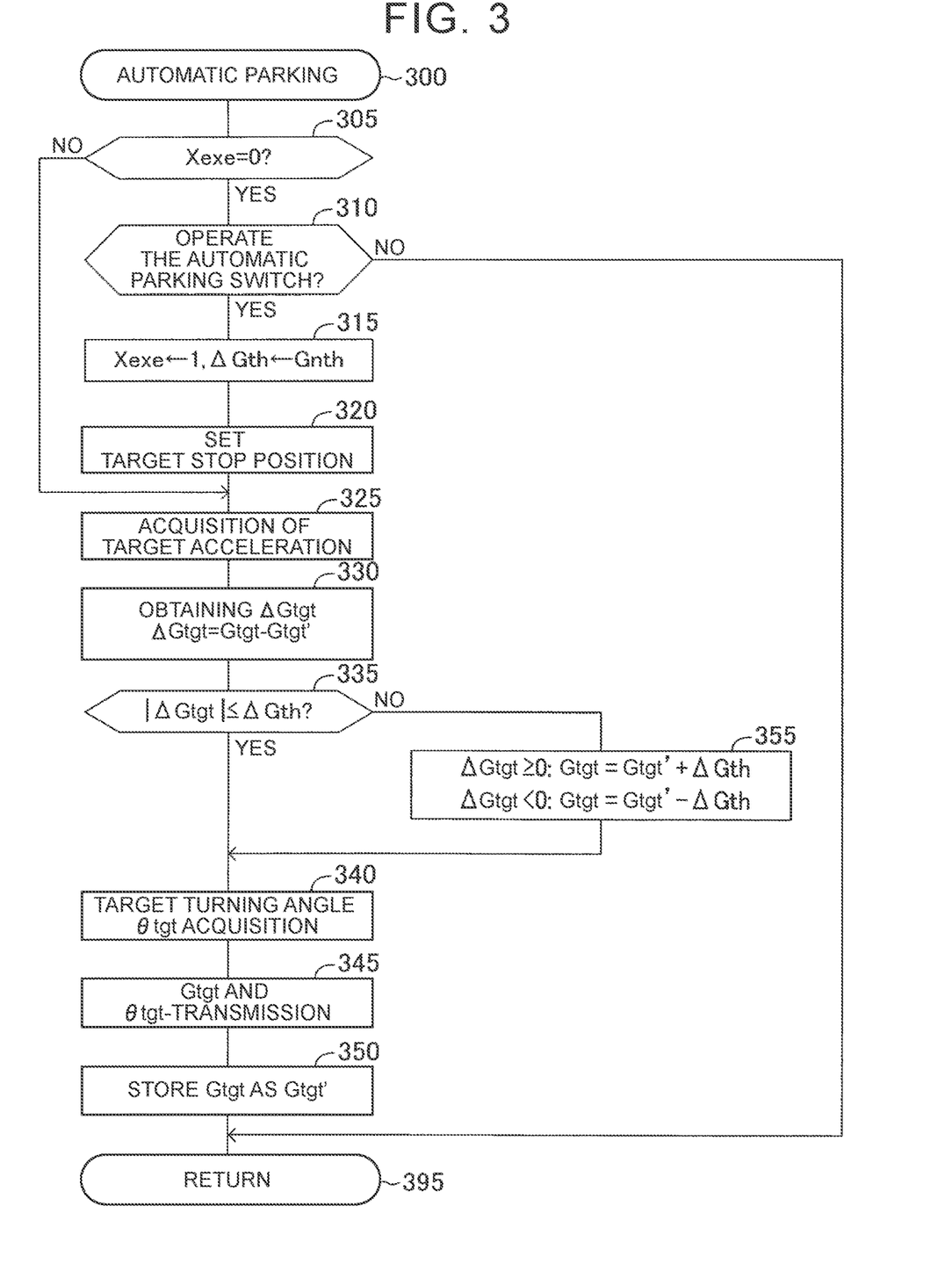
FIG. 3 is a flowchart showing an automatic parking control routine executed by the CPU of the parking ECU.

Therefore, at a predetermined timing, the CPU starts the process from step 300 in FIG. 3, proceeds to step 305, and determines whether the value of the execution flag Xexe is "0".

The value of the execution flag Xexe is set to "1" when the automatic parking control is executed, and is set to "0" when the automatic parking control is not executed. The run flag Xexe is set to "0" in the initialization routine. The initial routine is executed by the CPU when the ignition switch (not shown) is changed from the off position to the on position.

On the other hand, when the value of the execution flag Xexe is "0", the CPU determines "Yes" in step 305 and proceeds to step 310. In step 310, the CPU determines whether or not the driver has operated the automatic parking switch 29.

If the driver has not operated the automatic parking switch 29, the CPU determines "No" in step 310, proceeds to step 395, and ends this routine once.

On the other hand, when the driver operates the automatic parking switch 29, the CPU determines "Yes" in step 310, and sequentially executes steps 315 to 335.

Step 315: The CPU sets the value of the execute flag Xexe to "1" and sets the threshold variation ΔGth to the normal threshold Gnth.

Step 320: The CPU sets a target stop position.

Specifically, the CPU searches for a space in which the vehicle VA can park based on the image data and the sonar data, and displays the positional relationship between the space closest to the current position of the vehicle VA and the vehicle VA on the display. When the driver agrees to park the vehicle VA in the space, the driver operates a determination button (not shown). When the driver operates the determination button, the CPU sets the space to the target stop position.

The process of setting the target stop position includes various processes, and is not limited to the above-described example. For example, the driver may determine the target stop position from an image of the surroundings of the vehicle VA displayed on the display, and the CPU may set the position determined by the driver to the target stop position.

Step 325: The CPUs acquire the target acceleration Gtgt (the current target acceleration Gtgt).

A detailed process of the target acceleration Gtgt is described in JP 2020-15402 A, which will be briefly described here.

First, a position/speed feedback term (position/speed FB term) is added to an acceleration feedforward term (acceleration FF term) to obtain a first target acceleration. Then, an acceleration feedback term (acceleration FB term) is added to the first target acceleration, and the second target acceleration is acquired. Finally, the disturbance feedforward term (disturbance FF term) is added to the second target acceleration, and the target acceleration is obtained.

<Acceleration FF Item>

As the acceleration FF term, an acceleration for causing the vehicle VA to travel along the travel route from the current position of the vehicle VA to the target stop position is used.

<Position/Speed FB Item>

The position/speed FB term is a feedback term for matching the actual vehicle speed Vs and the position of the vehicle VA with the target vehicle speed and the target stop position. The position/speed FB term is obtained by proportional control with respect to the difference between the target vehicle speed and the target stop position, the vehicle speed Vs, and the current position of the vehicle VA.

<Acceleration FB>

The acceleration FB term is a feedback term for matching the acceleration G to the target acceleration Gtgt. The acceleration FB term is obtained by proportional-integral control with respect to a difference between the target acceleration Gtgt and the acceleration G.

<Disturbance FF Item>

The disturbance FF term is a feedforward term for correcting the influence of the disturbance. The disturbance FF term is obtained by adding the observable disturbance FF term and the unknown disturbance FF term. For example, the observable disturbance FF term is obtained based on the road surface gradient obtained based on the acceleration G. The unknown disturbance FF term is obtained based on the disturbance value Dv.

Note that the method of acquiring the target acceleration Gtgt is not limited to the above-described method.

Step 330: The CPU obtains the variation ΔGtgt by subtracting the previous target acceleration Gtgt' from the current target acceleration Gtgt.

Step 335: The CPU determines whether or not the magnitude (|ΔGtgt|) of the change amount ΔGtgt is equal to or less than the threshold change amount ΔGth.

When the magnitude of the change amount ΔGtgt is equal to or smaller than the threshold change amount ΔGth, the CPU determines "Yes" in step 335, and sequentially executes steps 340 to 350.

Step 340: The CPU acquires a target turning angle θtgt for the vehicle VA to travel along the travel route.

Step 345: The CPU transmits an acceleration/deceleration command including the target acceleration Gtgt to the drive ECU 30 and the brake ECU 40, and transmits a steering command including the target turning angle θtgt to the steering ECU 50.

Step 350: The CPUs store the current target acceleration Gtgt as the previous target acceleration Gtgt' in the RAMs. After that, the CPU proceeds to step 395 and temporarily ends this routine.

When the CPU proceeds to step 335, if the magnitude of the change amount ΔGtgt is larger than the threshold change amount ΔGth, the CPU determines "No" in step 335, and proceeds to step 355. In step 355, the CPU sets the target acceleration Gtgt to a value such that the magnitude of the change amount ΔGtgt is smaller than the threshold-change amount ΔGth.

Specifically, when the change amount ΔGtgt is equal to or greater than "0" (that is, when the target acceleration Gtgt is equal to or greater than the previous target acceleration Gtgt'), the CPU sets the current target acceleration Gtgt to "the value obtained by adding the previous target acceleration Gtgt' and the threshold change amount ΔGth".

On the other hand, when the change amount ΔGtgt is less than "0" (that is, when the target acceleration Gtgt is less than the previous target acceleration Gtgt'), the CPU sets the target acceleration Gtgt to "the value obtained by subtracting the threshold change amount ΔGth from the previous target acceleration Gtgt'".

After the execution of step 355, the CPU executes steps 340 to 350, proceeds to step 395, and ends the present routine.

On the other hand, when the CPU proceeds to step 305, and the value of the execution flag Xexe is "1", the CPU determines "No" in step 305 and proceeds to the process after step 325.

End Determination Routine

Figure 4:
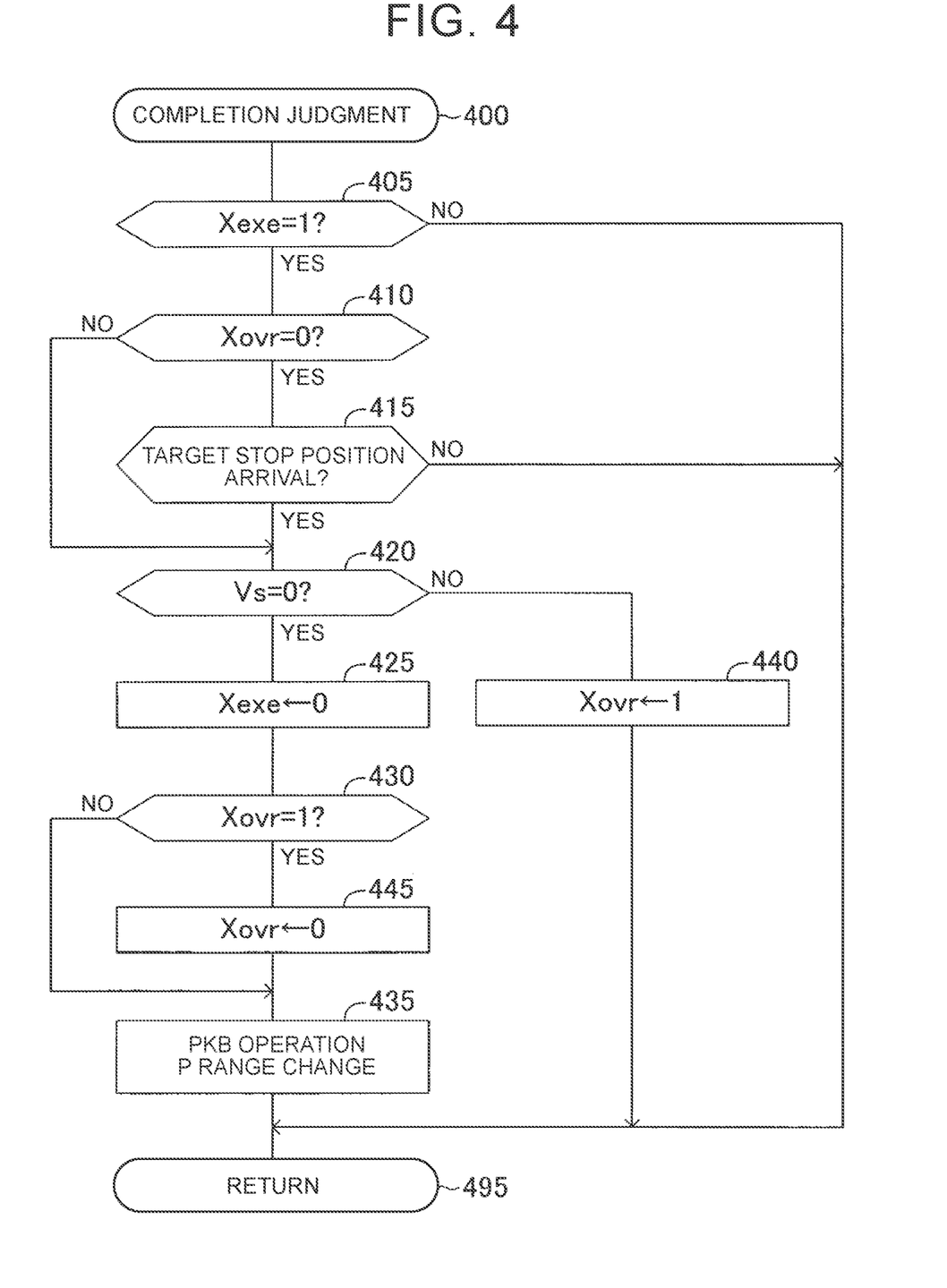
FIG. 4 is a flowchart showing an end determination routine executed by the CPU of the parking ECU.

The CPU executes an end determination routine shown by the flowchart in FIG. 4 every time a predetermined time elapses.

Therefore, at a predetermined timing, the CPU starts the process from step 400 in FIG. 4, proceeds to step 405, and determines whether the value of the execution flag Xexe is "1".

When the value of the execution flag Xexe is "0", the CPU determines "No" in step 405, proceeds to step 495, and temporarily ends this routine.

On the other hand, when the value of the execution flag Xexe is "1", the CPU determines "Yes" in step 405 and proceeds to step 410. In step 410, the CPUs determine whether the passing flag Xovr is "0".

The passing flag Xovr is set to "1" when the vehicle VA has not stopped even though the vehicle VA has reached the target stopping position. The passing flag Xovr is set to "0" when the vehicle VA is stopped after the vehicle VA has passed the target stopping position. The pass flag Xovr is set to "0" in the initialization routine.

When the passing flag Xovr is "0", the CPU determines "Yes" in step 410 and proceeds to step 415. In step 415, the CPU determines whether the vehicle VA has reached the target stop position.

When the vehicle VA has not reached the target parking position, the CPU determines "No" in step 415, proceeds to step 495, and temporarily ends this routine.

On the other hand, when the vehicle VA has reached the target stop position, the CPU determines "Yes" in step 415 and proceeds to step 420. In step 420, the CPU determines whether or not the vehicle VA has stopped, that is, whether or not the vehicle speed Vs is "0".

When the vehicle VA is stopped, the CPU determines "Yes" in step 420, and sequentially executes steps 425 and 430.

Step 425: The CPU sets the value of the execution flag Xexe to "0".

Step 430: The CPU determines whether or not the passing flag Xovr is "1".

When the passing flag Xovr is "0", the CPU determines "No" in step 430 and proceeds to step 435. In step 435, the CPU activates a parking brake actuator (not shown) and changes the shift position to parking. When the parking brake actuator is operated, a frictional braking force is applied to the wheels, and the shift position is changed to parking, whereby the stop state of the vehicle VA is maintained.

After that, the CPU proceeds to step 495 and temporarily ends this routine.

On the other hand, if the vehicle VA has not stopped when the vehicle VA has reached the target stop position, the CPU determines "No" in step 420 and proceeds to step 440. In step 440, the CPUs set the pass flag Xovr to "1". After that, the CPU proceeds to step 495 and temporarily ends this routine.

After the passing flag Xovr is set to "1", the CPU executes the routine and proceeds to step 410, the CPU determines "No" in step 410, and proceeds to step 420. If the vehicle VA is not stopped after the vehicle VA has passed the target stop position, the CPU determines "No" in step 420, proceeds to step 440, and sets the passing flag Xovr to "1". After that, the CPU proceeds to step 495 and temporarily ends this routine.

On the other hand, when the vehicle VA stops after the vehicle VA has passed the target stop position, the CPU determines "Yes" in step 420 and sets the execution flag Xexe to "0" in step 425. Thereafter, the CPU determines "Yes" in step 430 and proceeds to step 445, sets the passing flag Xovr to "0", and executes step 435. After that, the CPU proceeds to step 495 and temporarily ends this routine.

<Threshold Variation Setting Routine>

Figure 5:
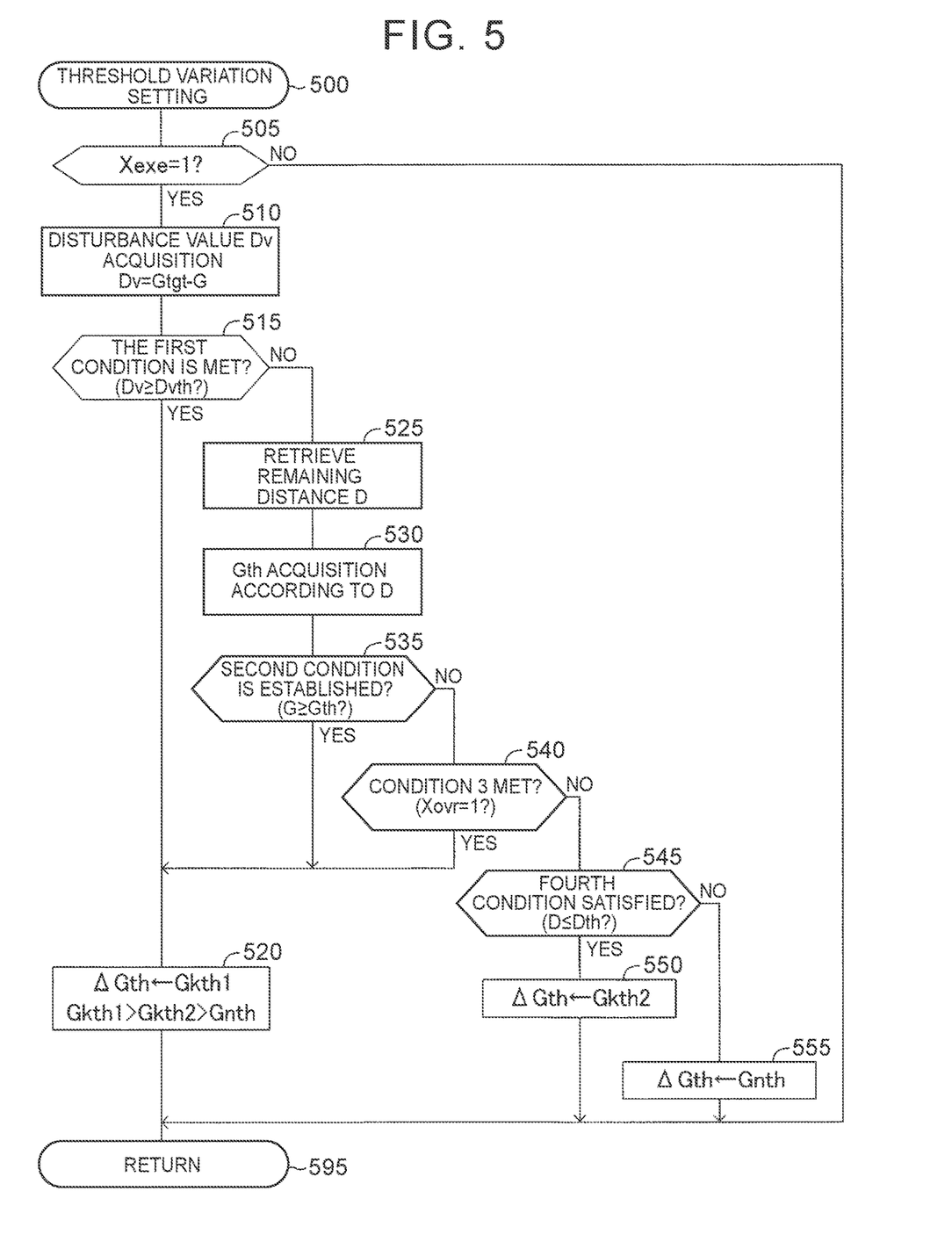
FIG. 5 is a flowchart illustrating a threshold change amount setting routine executed by the CPU of the parking ECU.

The CPU executes the threshold change amount setting routine illustrated by the flowchart in FIG. 5 every time a predetermined time elapses.

Therefore, at a predetermined timing, the CPU starts the process from step 500 in FIG. 5, proceeds to step 505, and determines whether the value of the execution flag Xexe is "1".

When the value of the execution flag Xexe is "0", the CPU determines "No" in step 505, proceeds to step 595, and temporarily ends this routine.

On the other hand, when the value of the execution flag Xexe is "1", the CPU determines "Yes" in step 505, and executes steps 510 to 515 sequentially.

Step 510: The CPU obtains the disturbance value Dv by subtracting the acceleration G from the target acceleration Gtgt obtained most recently.

Step 515: The CPU determines whether or not the first condition is satisfied (that is, whether or not the disturbance value Dv is equal to or greater than the threshold Dvth).

When the first condition is satisfied (when the disturbance value Dv is equal to or larger than the threshold value Dvth), the CPU determines "Yes" in step 515, and proceeds to step 520. In step 520, the CPUs set the threshold variation ΔGth to the first urgent threshold Gkth1. After that, the CPU proceeds to step 595 and temporarily ends this routine.

On the other hand, when the first condition is not satisfied (when the disturbance value Dv is less than the threshold value Dvth), the CPU determines "No" in step 515, and sequentially executes steps 525 to 535.

Step 525: The CPU acquires the remaining distance D as described above. Step 530: The CPU acquires the threshold acceleration Gth corresponding to the remaining distance D. Step 535: The CPU determines whether or not the second condition is satisfied (whether or not the acceleration G is equal to or greater than the threshold acceleration Gth).

When the second condition is satisfied (when the acceleration G is equal to or greater than the threshold acceleration Gth), the CPU determines "Yes" in step 535 and proceeds to step 520 to set the threshold change amount ΔGth to the first urgent threshold Gkth1. After that, the CPU proceeds to step 595 and temporarily ends this routine.

On the other hand, in a case where the second condition is not satisfied (in a case where the acceleration G is less than the threshold acceleration Gth), the CPU determines "No" in step 535 and proceeds to step 540. In step 540, the CPU determines whether or not the third condition is satisfied (whether or not the passing flag Xovr is set to "1"). As described above, when the vehicle VA is not stopped at the target stop position (that is, when the vehicle VA passes the target stop position), the passing flag Xovr is set to "1".

When the third condition is satisfied (when the value of the passing flag Xovr is set to "1"), the CPU determines "Yes" in step 540 and proceeds to step 520 to set the threshold variation ΔGth to the first urgent threshold Gkth1. After that, the CPU proceeds to step 595 and temporarily ends this routine.

On the other hand, when the third condition is not satisfied (when the passing flag Xovr is set to "0"), the CPU determines "No" in step 540, and proceeds to step 545. In step 545, the CPU determines whether or not the fourth condition is satisfied (whether or not the remaining distance D is equal to or less than the threshold distance Dth).

When the fourth condition is satisfied (when the remaining distance D is equal to or smaller than the threshold distance Dth), the CPU determines "Yes" in step 545 and proceeds to step 550. In step 550, the CPUs set the threshold variation ΔGth to the second urgent threshold Gkth2. After that, the CPU proceeds to step 595 and temporarily ends this routine.

When the fourth condition is not satisfied (when the remaining distance D is longer than the threshold distance Dth), the CPU determines that the emergency condition is not satisfied. In step 545, the CPU determines "No." and proceeds to step 555 to set the threshold variation ΔGth to the normal threshold Gnth. After that, the CPU proceeds to step 595 and temporarily ends this routine.

As described above, since the control device 10 sets the target acceleration Gtgt to "a value such that the change amount ΔGtgt does not exceed the threshold change amount ΔGth" this time, it is possible to prevent the acceleration G from rapidly increasing or decreasing. Accordingly, even when there is a control hysteresis in at least one of the drive source 34a and the braking device 44a, it is possible to prevent the vehicle VA from rapidly accelerating and decelerating, and thus it is possible to reduce the possibility that the vehicle VA vibrates.

Further, when the emergency condition is satisfied, the control device 10 sets the threshold variation ΔGth to a larger value (the first emergency threshold Gkth1 or the second emergency threshold Gkth2) than when the emergency condition is not satisfied. Emergency conditions are met when a larger driving force or braking force is required than during normal operation. When a driving force larger than that in the normal state is required, it is possible to increase a possibility that a driving force necessary for the drive source 34a is applied to the vehicle VA, and when a braking force larger than that in the normal state is required, it is possible to increase a possibility that a braking force necessary for the drive source 34a and the braking device 44a is applied to the vehicle VA.

The present disclosure is not limited to the above embodiment, and various modifications can be adopted within the scope of the present disclosure.

First Modification

The vehicle control device 10 according to the first modification may acquire the remaining distance D by subtracting "the measured distance Dm actually moved by the vehicle VA from the previous time to the current time" from the remaining distance D acquired last time, regardless of whether or not the target stop position is included in the image data.

Second Modification

The automatic parking control may be performed in a state in which the driver does not get on the vehicle VA (a state in which the driver gets off the vehicle VA). Such an automatic parking control is known as a remote automatic parking control, and is described in, for example, JP 2020-104529 A. Further, the control device 10 can be applied as long as it is a control for causing the vehicle VA to travel so as to stop at the target stop position. For example, the control device 10 is also applicable to an automatic delivery control for automatically delivering the parked vehicle VA.

Third Modification

The threshold distance Dth used to determine whether or not the fourth condition is satisfied may be set based on the relationship between the predetermined stop acceleration Gst for stopping the vehicle VA at the target stop position and the remaining distance D. The time required for the vehicle VA to stop is expressed by the following equation (1).

$$t = Vsp/Gst \tag{1}$$

(1) The expression "Vsp" is the current vehicle speed Vs.

Further, the distance D over which the vehicle VA travels in t seconds is expressed by the following Expression (2).

$$D = Vsp*t - \tfrac{1}{2}Gst*t^2 \tag{2}$$

(1) When the equation is substituted into the equation (2), the relationship between the stop acceleration Gst and the remaining distance D is expressed by the following equation (3).

$$Gst = \frac{Vsp^2}{2D} \tag{3}$$

The vehicle control device 10 according to the third modification obtains the remaining distance D by applying the current vehicle speed Vs to the "Vsp" in the above equation (3). Then, the vehicle control device 10 sets the remaining distance D to the threshold distance Dth.

Fourth Modification

The vehicle control device 10 can be mounted on a vehicle such as an engine-driven vehicle, a Hybrid Electric Vehicle (HEV), a Plug-in Hybrid Electric Vehicle (PHEV, a Fuel Cell Electric Vehicle (FCEV, and a Battery Electric Vehicle (BEV).

What is claimed is:

1. A vehicle comprising:
   a drive device for applying a driving force to a vehicle;
   a braking device for applying a braking force to the vehicle; and a control unit for controlling the drive device and the braking device such that an actual acceleration representing an actual acceleration of the vehicle coincides with a target acceleration for causing the vehicle to travel such that the vehicle stops at a preset target stop position, wherein the control unit acquires the target acceleration every time a predetermined time elapses, sets, when a magnitude of a change amount representing a difference between a current target acceleration that is the target acceleration acquired this time and a previous target acceleration that is the target acceleration acquired last time exceeds a threshold change amount, the current target acceleration to a value such that the magnitude of the change amount does not exceed the threshold change amount, and sets, when a predetermined emergency condition is satisfied, the predetermined emergency condition being a condition that is satisfied when the driving force or the braking force larger than the driving force or the braking force in a normal state is required, the threshold change amount to a larger value than when the emergency condition is not satisfied, and wherein the control unit determines whether the predetermined emergency condition is satisfied based on a disturbance value representing a magnitude of a disturbance that disturbs travel of the vehicle and a remaining distance representing a remaining distance to the target stop position.

2. The vehicle according to claim 1, wherein the control unit determines that the predetermined emergency condition is satisfied when any one of a first condition, a second condition, a third condition, and a fourth condition is satisfied, the first condition being a condition that the disturbance value is equal to or larger than a threshold value, the second condition being a condition that the actual acceleration is equal to or larger than a threshold acceleration set based on the remaining distance, the third condition being a condition that the vehicle has passed the target stop position, and the fourth condition being a condition that the remaining distance has become equal to or smaller than a predetermined threshold distance.

3. The vehicle according to claim 2, wherein when any one of the first condition to the third condition is satisfied, the control unit sets the threshold change amount to a larger value than when the fourth condition is satisfied.

* * * * *